(12) United States Patent
Tangemann et al.

(10) Patent No.: US 8,607,550 B2
(45) Date of Patent: Dec. 17, 2013

(54) SYSTEM FOR ADMIXING A REDUCING AGENT TO AN EXHAUST GAS FLOW OF AN INTERNAL-COMBUSTION ENGINE

(75) Inventors: Ruediger Tangemann, Steyr (AT); Klaus Schoenberger, Niederneukirchen (AT); Karl Mayr, Behamberg (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 590 days.

(21) Appl. No.: 12/724,579

(22) Filed: Mar. 16, 2010

(65) Prior Publication Data
US 2010/0170233 A1    Jul. 8, 2010

Related U.S. Application Data

(63) Continuation of application No. PCT/EP2008/008557, filed on Oct. 20, 2008.

(30) Foreign Application Priority Data

Nov. 30, 2007    (DE) ................... 10 2007 057 837

(51) Int. Cl.
*F01N 3/00* (2006.01)
*F01N 3/02* (2006.01)
*F01N 3/20* (2006.01)

(52) U.S. Cl.
USPC .................................. 60/295; 60/286; 60/324

(58) Field of Classification Search
USPC ..................... 60/286, 295, 303, 324
See application file for complete search history.

(56) References Cited

U.S. PATENT DOCUMENTS

| | | | |
|---|---|---|---|
| 2,965,303 A * | 12/1960 | Jackson ..................... | 239/132.5 |
| 5,386,696 A * | 2/1995 | Prigent et al. ................... | 60/300 |
| 6,513,323 B1 * | 2/2003 | Weigl et al. ..................... | 60/286 |
| 7,404,290 B2 * | 7/2008 | Gaiser et al. ................... | 60/289 |
| 7,797,932 B2 * | 9/2010 | Herrick et al. ................... | 60/303 |
| 2007/0163241 A1 | 7/2007 | Meingast et al. | |

FOREIGN PATENT DOCUMENTS

| | | |
|---|---|---|
| DE | 40 38 054 A1 | 6/1992 |
| DE | 198 20 990 A1 | 11/1999 |
| DE | 199 19 426 C1 | 3/2000 |

(Continued)

OTHER PUBLICATIONS

German Search Report dated Dec. 8, 2008 with English translation (nine (9) pages).

(Continued)

*Primary Examiner* — Thomas Denion
*Assistant Examiner* — Dapinder Singh
(74) *Attorney, Agent, or Firm* — Crowell & Moring LLP

(57) ABSTRACT

A system is provided for admixing a reducing agent to an exhaust gas flow of an internal-combustion engine. The system includes an exhaust line and a metering device for feeding the reducing agent into the exhaust line, the metering device is arranged in or on a hollow body arranged on the exhaust line. An inner volume of the hollow body is connected in an exhaust-gas-conducting manner with the exhaust line. The reducing agent is feedable by a nozzle into the hollow body. A jacket body is provided between the hollow body and the nozzle-fed reducing agent, which jacket body surrounds the reducing agent at least in areas in the inner volume. Accordingly, a depositing of reducing agent on the metering device and on the hollow body is substantially avoided.

9 Claims, 1 Drawing Sheet

(56) References Cited

FOREIGN PATENT DOCUMENTS

| DE | 10 2004 004 738 A1 | 8/2005 |
| DE | 10 2005 061 145 A1 | 6/2007 |
| DE | 10 2006 049 620 A1 | 4/2008 |
| DE | 20 2008 001 547 U1 | 5/2008 |
| FR | 2 900 440 A3 | 11/2007 |
| JP | 2007-784 A | 1/2007 |

OTHER PUBLICATIONS

International Search Report dated Feb. 4, 2009 with English translation (six (6) pages).

\* cited by examiner

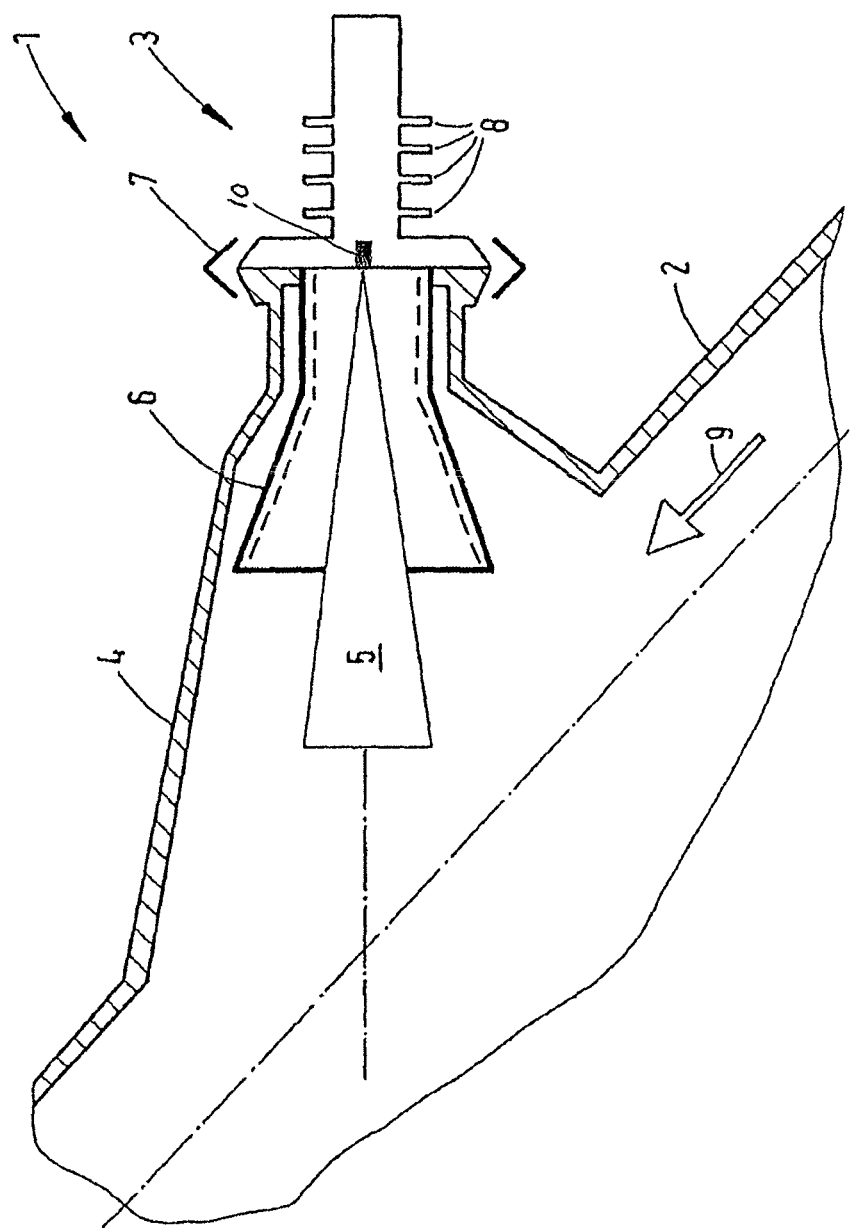

SYSTEM FOR ADMIXING A REDUCING AGENT TO AN EXHAUST GAS FLOW OF AN INTERNAL-COMBUSTION ENGINE

CROSS-REFERENCE TO RELATED APPLICATIONS

This application is a continuation of PCT International Application No. PCT/EP2008/008557, filed Oct. 20, 2008, which claims priority under 35 U.S.C. §119 from German Patent Application No. DE 10 2007 057 837.9, filed Nov. 30, 2007, the entire disclosures of which are herein expressly incorporated by reference.

BACKGROUND AND SUMMARY OF THE INVENTION

The invention relates to a system for admixing a reducing agent to an exhaust gas flow of an internal-combustion engine.

Concerning the technical background, reference is made, for example, to German Published Patent Document DE 40 38 054 A1. In DE 40 38 054 A1, a system is described for admixing a reducing agent to an exhaust gas flow of an internal-combustion engine having an exhaust line and a metering device for feeding the reducing agent into the exhaust line. The system further contains a tripartite evaporator for evaporating the reducing agent, the first part through which the exhaust gas flows consisting of a metallic honeycomb body whose fins can be heated by the exhaust gas. The heating fins of the metallic honeycomb body are arranged to be aligned in the flow direction of the exhaust gas. For admixing the reducing agent, a nozzle device is angled 90° and projects into the exhaust line. By means of this nozzle device, reducing agent is added to the exhaust gas, which reducing agent evaporates on the heated heating fins and thereby becomes chemically active in order to eliminate nitrogen oxides ($NO_x$) in a special nitrogen oxide reduction catalyst. A urea water solution or ammonia is preferably used as the reducing agent.

From the unpublished German patent application having official file number DE 10 2006 049 620.5, on which the present invention is based, a system for admixing a reducing agent, such as a urea water solution or ammonia, to the exhaust flow of an internal-combustion engine, is also known. This extremely advantageous further development distinguishes itself from the above-mentioned state of the art by the fact that the metering device is arranged in or on a hollow body arranged at the exhaust line, the inside volume of the hollow body being connected with the exhaust line in an exhaust-gas-conducting manner. By means of the suggested further development according to the invention, a particularly favorable flow resistance, i.e. a particularly low flow resistance, is achieved and the power of the internal-combustion engine is thereby increased.

However, despite the fact that the further development is extremely favorable with respect to the flow, reducing agent may still deposit on the metering device or on the hollow body, which, in turn, may have a negative effect on the particularly favorable flow resistance.

There is therefore needed a measure by which deposits of reducing agent are decreased or avoided.

This and other needs are met by a system for admixing a reducing agent to an exhaust gas flow of an internal-combustion engine, having an exhaust line and a metering device for feeding the reducing agent into the exhaust line. The metering device is arranged in or on a hollow body arranged on the exhaust line, the inside volume of the hollow body being connected in an exhaust-gas-conducting manner with the exhaust line. The reducing agent is feedable by nozzle into the hollow body. A jacket body is provided between the hollow body and the nozzle-fed reducing agent, which jacket body surrounds the reducing agent at least in areas in the inside volume.

As a result of the further development according to the invention, the combination of a flow-optimized hollow body in connection with the jacket body according to the invention, which surrounds the reducing agent in the inside volume at least in areas, provides a remedy here.

According to a further development, the jacket body can be heated electrically and/or by an exhaust gas. Thus, the deposits of the reducing agent can be evaporated in a simple manner without any problems and can therefore be removed without residue and in a manner that is not toxic to the environment. The heating has the purpose of keeping the jacket body in a desired temperature range. There are basically two heating strategies. At high temperatures above 300° C., the deposits can virtually be burnt off. Otherwise, the heating can be used for adjusting the temperature such that a catalytic coating can have an optimal effect. For this purpose, temperatures of above 200° C. are required. The heating can, for example, take place electrically by way of a heating conductor wound around the jacket body. When the temperature dependence of the electric resistor of the heating conductor is sufficiently high, a temperature control can be carried out without any additional sensor system. However, the jacket body may also be designed such that a heating can be achieved by way of the exhaust gas flowing past it.

According to further developments, the jacket body is catalytically coated at least in areas. The catalytic coating may be titanium dioxide or aluminum oxide. The catalytic coating acts as a hydrolysis catalyst for the reduction decomposition products. Particularly preferably, for example, the titanium dioxide ($TiO_2$) coating or the aluminum oxide ($Al_2O_3$) coating is contemplated as the catalytic coating. Catalytic coatings can be effective only if they have a sufficiently large surface and if the required temperature range is observed. The required coating surface is ensured by means of the surface of the jacket body. As a result of the fact that exhaust gas can also flow around the jacket body or the jacket body can be heated electrically, the temperature of the coating can be maintained to be correspondingly high.

The desired thermal behavior of the jacket body is assisted by thermally insulating the jacket body at least in areas. The use of an air gap insulation is a particularly preferred further development for the thermal insulation.

By means of a corresponding shaping-out of the jacket body, the metering device is protected from hot exhaust gas and a so-called flash boiling of the reducing agent by an excessively high temperature at the metering device is prevented.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a sectional view of a system for admixing a reducing agent to an exhaust gas flow of an internal-combustion engine.

DETAILED DESCRIPTION OF THE DRAWING

FIG. 1 is a sectional view of a system 1 for admixing a reducing agent 5 to an exhaust gas flow of an internal-combustion engine. The system 1 is used for the exhaust treatment of internal-combustion engines, particularly diesel internal-combustion engines, for reducing emitted nitrogen oxides by nozzle feeding a reducing agent 5, such as an aqueous urea solution or ammonia. On the output side, the system 1 can also be combined with a DeNO$_x$ catalyst, such as an SCR catalyst (selective catalytic reduction) or an NSCR catalyst (non-selective catalytic reduction).

The system 1 consists essentially of a metering device 3 arranged on a largely cup-shaped hollow body 4 which, in turn, is arranged on a section of the exhaust line 2 of the internal-combustion engine, an interior space of the hollow body 4 being connected in a gas-conducting manner with the exhaust line 2. A flow direction of an exhaust gas of the internal-combustion engine is marked by an arrow 9. By means of the metering device 3, the reducing agent 5 is fed approximately conically into the exhaust line 2 of the internal-combustion engine (not shown) by way of nozzle feeding by a nozzle 10 or injecting. In this case, the conical shape may also be considerably deformed by flowing exhaust gas. By way of a fastening element 7, the metering device 3 is flanged to the hollow body 4. In order to ensure a stabilization of the temperature of the metering device 3, i.e. to avoid an overheating, it has cooling bodies 8 radially on its outer circumference. It is thereby achieved that a valve tip of the metering device 3 does not reach more than 120° C., so that the effect of flash boiling, where the reducing agent is atomized in an uncontrolled manner, is avoided. For example, ammonium ($NH_3$) or an (aqueous) urea solution ($H_2NCONH_2$) are used as the reducing agent.

Particularly when an aqueous urea solution is used, deposits of reducing agent 5 may occur on the metering device 3, the hollow body 4 and the exhaust line 2. In this case, mainly the following secondary reactions take place. At approximately 152° C., the formation of reactive isocyanic acid from the hydrolysis of urea may take place and biuret may be formed. At approximately 175° C., the formation of isocyanuric acid and ammelide will start simultaneously, in which case the reaction rates are very low. The biuret decomposition will start at approximately 193° C., above the decomposition temperature of urea. As a result, the urea further decomposes to form ammonia and isocyanic acid.

Furthermore, the trimerization (trimerization is the combination of three molecules—the monomers—to form a trimer) of isocyanic acid for forming cyanuric acid will occur at approximately 193° C., and ammelide will be formed. At approximately 225° C. ammeline will be formed, but will be formed more slowly than cyanuric acid or ammelide. A complete decomposition of biuret will start at approximately 325° C., and melamine will be formed. Cyanuric acid will be decomposed to form isocyanic acid at temperatures of approximately 320° C. to approximately 380° C.; i.e. the deposits evaporate and dissolve.

The above-mentioned chemical processes therefore result in an accumulation of deposits in the case of certain driving profiles (for example, short distance driving or prolonged operation in the lower to medium partial load range of the internal-combustion engine), whereby an optimal exhaust treatment for reducing the nitrogen oxides is almost no longer possible without the further development according to the invention.

It is therefore provided that a jacket body 6 is arranged between the hollow body 4 and the nozzle-fed or injected reducing agent 5, which jacket body 6 envelopes the reducing agent 5 at least in areas in the inside volume. The jacket body 6 can preferably be heated by the exhaust gas and/or electrically. The heating has the object of keeping the jacket body 6 in a desired temperature range. There are basically two heating strategies. At high temperatures of above 300° C., the deposits can virtually be burnt off. Otherwise, the heating can be used for adjusting the temperature such that a catalytic coating mentioned in the following can have an optimal effect. For this purpose, temperatures of approximately 200° C. are necessary. The electric heating can take place, for example, by way of a heat conductor which is wound around the jacket body 6. In the case of a sufficiently high temperature dependence of the electric resistor of the heat conductor, a temperature control can be carried out without an additional sensor system. However, the jacket body 6 may also be designed such that heating can be achieved by way of the exhaust gas flowing past it.

In a further, particularly preferred embodiment, the jacket body 6 can be catalytically coated at least in areas. The catalytically active coating acts as an hydrolysis catalyst for the reducing agent decomposition products. For example, a titanium dioxide ($TiO_2$) coating or an aluminum oxide ($Al_2O_3$) coating may be used as the catalytic coating. Catalytic coatings can be effective only if they have a sufficiently large surface and, as indicated above, the required temperature range is observed. The required size of the coating is ensured by means of the size (surface) of the jacket body 6. As a result of the fact that exhaust gas also flows around the jacket body 6, the temperature of the coating is maintained to be correspondingly high during the normal driving operation.

Particularly preferably, the jacket body 6 is thermally insulated at least in areas. The jacket body 6 is particularly preferably insulated by way of an air gap (a so-called "air gap insulation" shown by the dashed lines in FIG. 1 which form the air gap) as known, for example, from the construction of exhaust systems.

Furthermore, the jacket body 6 is particularly preferably shaped-out such that the metering device 3 itself, particularly the nozzle-feeding or injection area, is protected from a direct action of hot exhaust gas.

The jacket body 6 is made of a temperature-resistant material, such as metal (high-grade steel, etc.) or a ceramic material, and is fastened in the system 1 by a frictional connection, by form locking and/or by material locking.

In the present embodiment, the jacket body 6 encloses the reducing agent in the hollow body 4 largely completely conically. In further embodiments, the shape may also deviate from a rotationally symmetrical shape, or the jacket body 6 may also have penetrations, notches or deformations. The conical shape of the jacket body 6 may also be more or less pronounced in further embodiments. The distance of the metering device 3 from the exhaust line 2 may also be greater or smaller in further embodiments.

According to the exemplary embodiment of the invention, the reducing agent 5 is prevented from being deposited on the hollow body 4, the exhaust line 2, and also on the metering device 3 itself. The emission stability of the internal-combustion engine or of the vehicle is therefore ensured for a very long service life.

| Table of Reference Numerals: | |
| --- | --- |
| 1 | System |
| 2 | Exhaust line |
| 3 | Metering device |
| 4 | Hollow body |
| 5 | Reducing agent |
| 6 | Jacket body |
| 7 | Fastening element |

-continued

Table of Reference Numerals:

| 8 | Cooling body |
|---|---|
| 9 | Flow direction |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for admixing a reducing agent to an exhaust gas flow of an internal-combustion engine, the system comprising:
    an exhaust line of the internal-combustion engine;
    a metering device operatively configured to feed the reducing agent into the exhaust line, said metering device being arranged in or on a hollow body arranged on the exhaust line, an inner volume of the hollow body being operatively connected in an exhaust-gas-conducting manner with the exhaust line;
    a jacket body operatively configured between the hollow body and the reducing agent feedable by a nozzle of the metering device into the hollow body, said jacket body at least partially surrounding the reducing agent in the inner volume,
    wherein the jacket body includes a catalytical coating.

2. The system according to claim 1, wherein the jacket body is heatable by at least one of an electrical heater and the exhaust gas flow of the internal-combustion engine.

3. The system according to claim 1, wherein the catalytic coating is one of titanium dioxide and aluminum oxide.

4. The system according to claim 1, wherein the jacket body is thermally insulated at least in areas.

5. The system according to claim 1, wherein the jacket body is thermally insulated at least in areas.

6. The system according to claim 4, wherein the thermal insulation comprises an air gap around the jacket body.

7. The system according to claim 5, wherein the thermal insulation comprises an air gap around the jacket body.

8. The system according to claim 1, wherein the jacket body is operatively configured to shield the metering device from the exhaust gas flow of the internal-combustion engine.

9. The system according to claim 1, wherein the exhaust line of the internal-combustion engine is arranged downstream of an exhaust manifold.

* * * * *